United States Patent Office 3,410,690
Patented Nov. 12, 1968

3,410,690
LIQUID FEED SUPPLEMENT FOR POULTRY
Robert K. Lindburg, deceased, late of Arcadia, Wis., by Justine Lindburg Swope, administratrix, Rte. 1, Cochrane, Wis. 54622
No Drawing. Continuation-in-part of application Ser. No. 229,501, Oct. 9, 1962. This application June 18, 1965, Ser. No. 465,212
3 Claims. (Cl. 99—4)

ABSTRACT OF THE DISCLOSURE

A liquid feed supplement for addition to the drinking water of poultry comprising an emulsion of a syrup, water and fat, with the syrup being a mixture of emulsifiers, water and an edible alcohol.

---

This application is a continuation-in-part of Ser. No. 229,501, filed Oct. 9, 1962, now abandoned.

This invention relates to improvements in supplementary feeding of animals for securing quicker growth and moister and tenderer meat, and particularly to use of drinking water or other liquids for feeding, supplementary to the solids being fed.

In feeding animals such as poultry for maximum growth and particularly maximum growth per pound of feed and in the shortest possible time, it has been found that poultry will consume only a given amount of solid food and that, it is believed, about 72–76% of the feed is used for body maintenance so that only about 24–28% goes into growth. Further, it has been found that fats and particularly vegetable fats contribute largely to the rate of feed conversion by poultry. The problem, however, is to provide more than 10% of fat in solid feed because the feed then loses its clean appearance and free-flowing characteristics and becomes adhesive and gummy, and such feed is impractical for commercial purposes.

Drinking water has been heretofore used in attempts at mass medication but no one has been successful in the use of drinking water to supply nutrients such as fats. The present invention provides for combining some desired nutrients with drinking water and has the advantage of being in a form to add directly to the 24–28% of feed used for growth and of allowing formulations, such that solid and liquid feeds are supplemental to one another, and various nutrients can be offered in their best form. A liquid feed composition can also be used to provide sanitized water, antibiotics, flavors attractive to poultry and the like, which do not interfere with the additions of nutrients such as fats. Further, liquid feeding, due to increased feed intake, gives chicks a faster start, and produces marketable poultry faster and at a savings of as much as 1¢/lb. compared to prior practices.

In general, the present formula provides a creamy homogenized emulsion of fats and oils in water together with other materials not readily furnished in solid feed and which increases palatability and metabolization of the oils. The emulsion is then fed to the drinking water flow by way of a suitable proportioning device, in an amount found to promote use of the greatest quantity of drinking water by a given flock. The ingredients, other than the fat, cost less than 1¢ per lb. of fat. More than twice the amount of usable fat in a solid feed alone, can now be fed by way of liquid feeding. A combination of emulsifiers produces the correct hydrophilic-lipophilic balance for a very stable oil-in-water emulsion and the emulsion is subsequently diluted by drinking water which assumes a very milky appearance and has a taste which poultry prefer over raw drinking water. A minor quantity of edible alcohol greatly reduces the amount of emulsifier required per pound of oil. Disinfectants, medicants and flavoring agents are added as desired, but do not appear to have effect on the liquid feed formulation.

Examples of specific supplementary feeding formulae which have been experimentally used and give increased animal weight or reducing feeding time for a given weight, or both, and which produce more rapidly cooked and moister and more tender meat, as compared to the results from the solid feed and untreated drinking water alone, are as follows.

I

Syrup: Parts by weight
    Emulsifier (Tween 80) _____ 4
    Emulsifier (Neutronyx 600) _____ 4
    Water _____ 5

Feed liquid:
    Syrup _____ 1
    Water (1 gal.) _____ 36
    Fat (soya or other vegetable oil) (2 gals.) _____ 67

II

Syrup:
    Emulsifier (Tween 80) _____ 4
    Emulsifier (Neutronyx 600) _____ 4
    Emulsifier (C.B. Maraperse) _____ ¼
    Alcohol _____ 2½
    Water _____ 5

Feed liquid:
    Syrup _____ 4
    Water (1 gal.) _____ 36
    Fat (soya or other vegetable oil) (2 gals.) _____ 67

Tween 80 is liquid sorbitan monooleate, sp. gr. 1.05–1.10 Neutronyx 600 (also called Osco 500) is fatty acid ester of a polyglycol, C.B. Maraperse is a lignin-sulfonic compound in the form of a black powder, and all of the above three materials are dispersants and emulsifiers.

The emulsifiers are balanced as to their hydrophilic and lipophilic qualities to produce a stable oil-in-water emulsion and therefore have an HLB of 3 to 6 which, as is well known, is required to make such emulsion. It has been found that addition of one of the lighter edible alcohols reduces both the cost and the effort required in producing a homogeneous emulsifier-water syrup and in emulsifying and homogenizing the final feed. For example, Formula II was used with 2½ parts by weight of ethanol. The weight of the alcohol above stated is a maximum, but any amount up to 2½ parts by weight may be used. Only a small quantity of alcohol is used so that the additional emulsifying effect of the alcohol cannot be only a matter of solution of the fat, and there is a contraction in volume of the component to which alcohol is added. Obviously the effect of alcohol is more than is to be normally expected therefrom. The alcohol also aids digestion and acts as a tranquilizer in stress control.

Other materials have also been added to either the syrup or the liquid feed such as quaternary ammonium compounds to sterilize the water or antibiotics, if the need exists. In addition to the above incidental and optional components, it has been found that addition of up to two parts by weight of citric acid added to the syrup of either of the above formulae produces a flavor which is attractive to all domestic fowl in either of the above formulae.

Although the fat may be either animal or vegetable fat, which can be metabolized by poultry, fats are preferred which are rich in linoleic, linolenic and arachidonic acids as such fatty acids provide the so-called L-factor in nutrition and improve the flavor and tenderness of meat as compared to meat produced with solid feed only. Vegetable oils such as soya and corn oil are particularly suitable in the present formulae. Also we need not use a refined fat but can use residues from fat recovery processes.

In preparation, the syrup is first mixed in a blender to homogenized condition. To the formula amount of syrup is then added the stated amount of water. The fat or oil in liquid condition is then added at the rate of up to two parts per minute while the blender is operating. After all fat has been added the blender is operated for an additional 5-10 minutes.

The product is a creamy, yellowish oil-in-water emulsion which is added by a proportioning device to drinking water supplied to animals, at the rate of 16–32 oz. per gal. of drinking water. It has been found convenient to supply fats in quantities of more than 20% of the total feed as opposed to the usual 10% maximum which can be properly handled in solid food.

In one series of feeding tests, seven pounds of ordinary solid feed were required to produce a 3½ lb. pullet as compared to a total of 3 lbs. of solid feed and 1 lb. of the present liquid feed for the same weight increase. In other feeding tests, all corn or other grain was omitted and only 6 lbs. of liquid feed was employed to produce a 4½ lb. pullet. The above increase in rate of conversion by the animals seems to be due in large part to the fine subdivision of nutrients in the liquid feed so that fatty acid particles move quickly into the blood stream and to the place of utilization and the amount of nutrients excreted is kept to a minimum.

In one feeding test, observed by others, whose testimony is available, two hundred incubator run one-day old chicks were separated into four pens and two of the pens were fed a well known commercial dry composition for young poultry while the remaining two pens were fed both the commercial dry composition and the high fat drinking water described above. At nine weeks three days old, the pullets were removed leaving the cockerels as follows:

| Pen: | Cockerels |
|---|---|
| I | 26 |
| II | 25 |
| III | 26 |
| IV | 24 |

Feeding was continued for a total of fifteen weeks when the chickens were all weighed alive with the following results:

| Pen: | Av. live weight, lbs. |
|---|---|
| I | 7.07 |
| II | 6.76 |
| III | 7.88 |
| IV | 8.29 |

It will be seen that the high fat drinking water additive added a pound or more to the average live weight of the chickens as compared to a well known commercial feed. An unexpected advantage is relaxation of the skin follicles which make poultry easier and faster to pluck. Another unexpected advantage is that liquid feeding greatly reduces the size of the gastro-intestinal system, which results in increased meat yield for a given size of fowl and reduces the "live" cost per lb.

It will be seen that a lesser amount of feed is required and approximately one-seventh increase in weight over comparable feeding of poultry by the known commercial composition. The present composition is reached in the face of multiple efforts by many persons to increase poultry weight for shipment to the Common Market especially. The present composition needs no special feeding efforts and it is simply a matter of proportioning the same to the drinking water as desired.

I claim:
1. A liquid feed supplement containing fat and adapted to be added to the drinking water of poultry already receiving a solid ration which includes up to 10% fat in order to promote growth, said supplement comprising an emulsion consisting of a syrup, water and a fat selected from the group consisting of soya and corn oil; said syrup containing 4–8 parts by weight of an emulsifier having an HLB of 3–6 and approximately 5 parts by weight of water, said oil being present in an amount sufficient to increase the total fat content of the diet to at least 20%.

2. A supplement according to claim 1 with citric acid added in an amount up to two parts by weight.

3. A supplement according to claim 1 containing an effective amount of alcohol up to 2½ parts by weight of the syrup.

References Cited

UNITED STATES PATENTS

| 2,472,663 | 6/1949 | Kleine et al. | 99—2 |
| 2,703,285 | 3/1955 | Luter | 99—2 |
| 3,031,376 | 4/1962 | Levin et al. | 99—2 |

RAYMOND N. JONES, *Primary Examiner.*

J. M. HUNTER, *Assistant Examiner.*